Oct. 26, 1971  E. H. WITHERS  3,614,844
FLOOD GATE STRUCTURE
Filed April 21, 1970  2 Sheets-Sheet 1
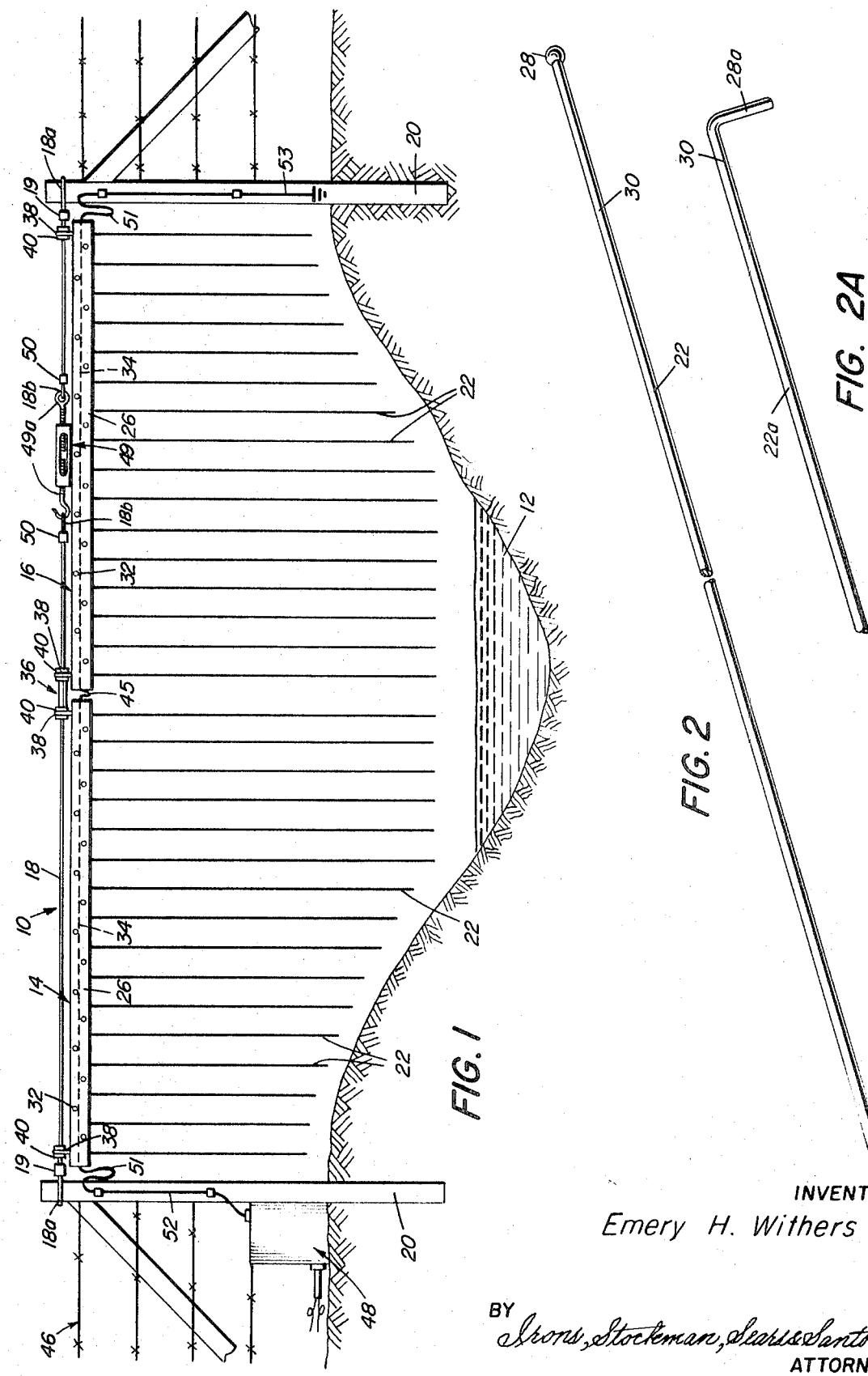
INVENTORS
Emery H. Withers
BY Irons, Stockman, Sears & Santorelli
ATTORNEYS

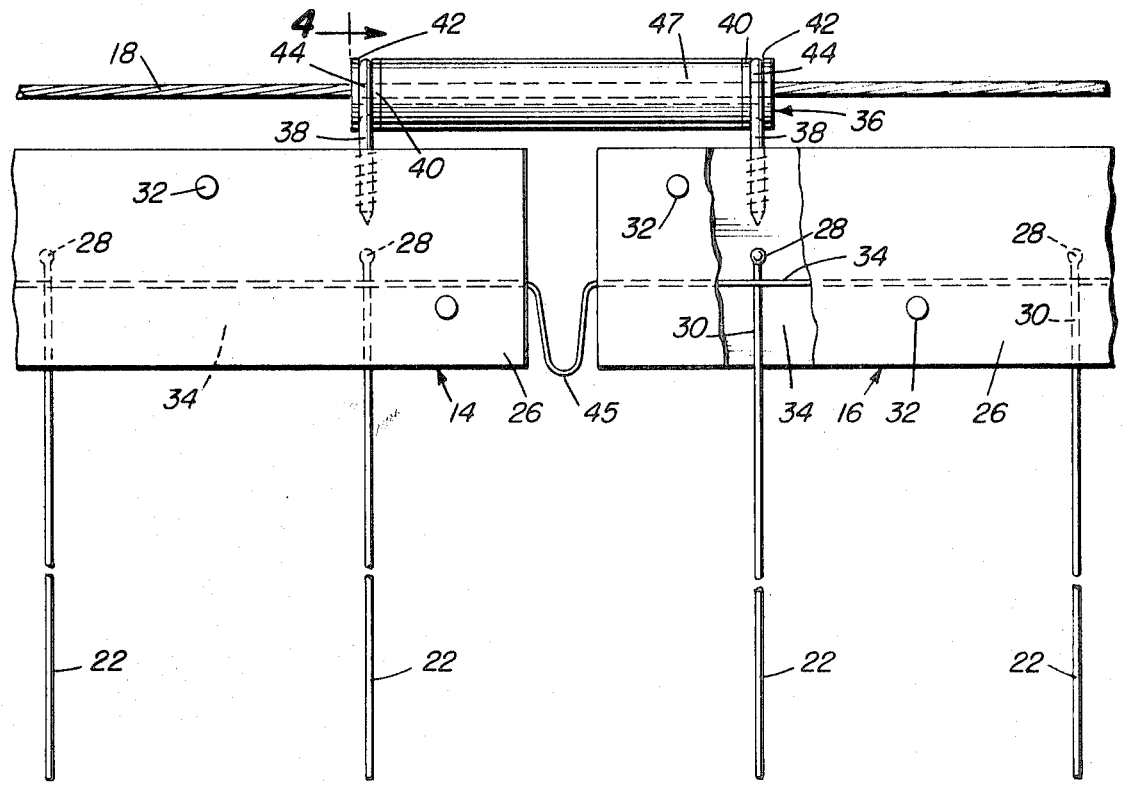
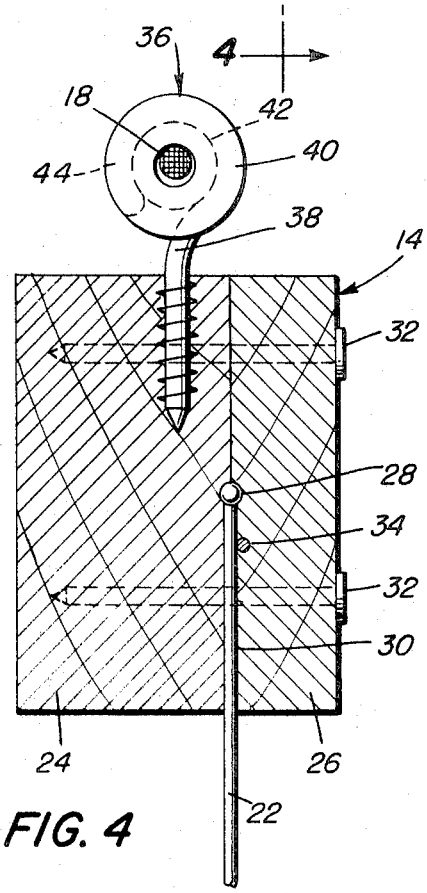
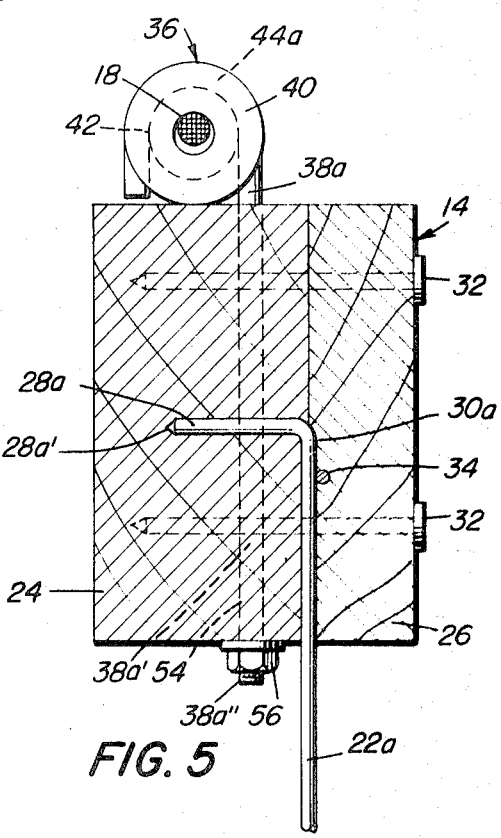

United States Patent Office 3,614,844
Patented Oct. 26, 1971

3,614,844
FLOOD GATE STRUCTURE
Emery H. Withers, Road 2, Cynthiana, Ky. 41031
Filed Apr. 21, 1970, Ser. No. 30,570
Int. Cl. E06b *11/02*
U.S. Cl. 49—10
10 Claims

ABSTRACT OF THE DISCLOSURE

A flood gate structure for an electric fence comprises an assembly having a plurality of rod members disposed in side-by-side, laterally spaced relationship. The assembly is mounted on a cable extending across a ground identation and is swingable about the cable to move upwardly out of the way of flood waters and debris carried thereby. The assembly normally hangs from the cable with the rod members providing an electric barrier for the indentation.

BACKGROUND OF THE INVENTION

Field of the invention

The present invention relates generally to the field of electric stock retaining fences and in particular to electric flood gate structure useful in connection with such a fence for providing an electric stock retaining barrier at ravines, gulleys, dry creek beds, small streams and the like.

DESCRIPTION OF THE PRIOR ART

Electric fences are useful as stock retaining barriers only if they follow the major contours of the ground and remain closely spaced to the ground at all places along their length. To avoid the presence of a large enough gap to permit livestock to escape, at ravines, gulleys, dry creek beds, small streams and the like, it has been necessary in the past to run a fence down one bank of the ravine or the like and then up the other bank rather than across the ravine from the tops of the banks. This has required the presence of fence posts at the lower portions of the ravine.

However, often during heavy rains or rapid melting conditions, flooding may occur to destroy fences having posts at such locations. Manifestly, as flood waters recede, livestock may escape because the fence has been washed away.

One suggested solution to this problem was to mount the fence on pontoons (U.S. Pat. No. 2,194,108). This solution obviously was expensive and apparently has not had wide usage. Further, such a structure would probably not withstand heavy debris travelling at high rates of speed in rapidly moving flood waters. Furthermore, in turbulent water, it is apparent that such pontoon type structure could easily become tangled since it is retained against movement by only a flexible cable.

SUMMARY OF THE INVENTION

The primary object of this invention is to avoid the drawbacks set forth above by providing an electric flood gate structure which is swingably mounted to move upwardly out of the way of rushing flood waters and debris during flood conditions and which will swing downwardly into its proper position as the flood waters recede. It is an important aim of the invention to provide such a structure which is of heavy duty construction to resst damage by rushng waters and debris. The invention also has as a purpose the provision of such flood gate structure for electric fences wherein the structure has a simple and economical construction.

According to the present invention there is provided flood gate structure for an electric fence comprising an elongated support adapted for spanning a ravine, gulley, dry creek bed, stream or the like thereabove. The structure also comprses an electrically conductive assembly including a plurality of electrically conductive rod members disposed in laterally spaced side-by-side relationship and conductor means interconnecting the rod members. Included in the structure are hanger means constructed to mount the assembly on the support for swinging about an axs extending generally parallel to the support and with the rod members normally depending therefrom.

A single assembly may be used. Alternately a plurality of assemblies may be aligned along a single elongated support which most generally and preferably comprises a cable. In either case, the length of the rod members should be such that the lower end of each is spaced closely to the ground. Manifestly, this will usually mean that the rod members in the middle of the ravine (or the like) will be longer than those at the sides thereof.

BRIEF DESCRIPTION OF THE DRAWINGS

FIG. 1 is an elevational view of flood gate structure for an electric fence which embodies the concepts and principles of the instant invention illustrating the manner in which the structure is positioned in a ravine, gulley, dry creek bed, stream or the like;

FIG. 2 is an enlarged, fragmentary, perspective view of an electrically conductive rod member useful in practicing the invention;

FIG. 2A is an enlarged, fragmentary, perspective view of another electrically conductive rod member useful in practicing the invention;

FIG. 3 is an enlarged, fragmentary, elevational view illustrating constructional details of the structure;

FIG. 4 is a cross-sectional view taken substantially along line 4—4 of FIG. 3; and FIG. 5 is a cross-sectional view similar to FIG. 4, b.it illustrating a second embodiment of the invention.

DESCRIPTION OF THE PREFERRED EMBODIMENT

Flood gate structure for an electric fence which embodies the concepts and principles of the instant invention is illustrated in FIG. 1 and is broadly designated by the numeral 10. As illustrated, structure 10 may be utilized to provide an electric barrier at a small stream 12 shown in cross-section. It is to be understood that structure 10 might also be utilized to provide an electric barrier at other ground indentations such as ravines, gulleys, dry creek beds and the like.

As shown in FIG. 1, structure 10 comprises a pair of electrically conductive assemblies 14 and 16 disposed in longitudinally aligned relationship along an elongated support in the nature of cable means 18. Cable 18 may preferably be mounted between a pair of fence posts 20 or the like to extend above stream 12. In this regard it should be appreciated that the function of posts 20 could be performed by trees if the latter were appropriately positioned. Cable 18 is provided with a loop 18a at each end thereof, positioned around a corresponding post 20. Each loop 18a being secured by means of a clamp 19 or the like.

An adjustable turnbuckle 49 may be provided for tensioning cable 18 between posts 20. For this purpose cable 18 may be provided with loops 18b secured by clamps 50. The hooks 49a of turnbuckle 49 are attached through loops 18b so that turnbuckle 49 can be operated to tension cable 18 in a manner well known to those skilled in the art.

In their constructional details, assemblies 14 and 16 are substantially identical and each includes a plurality of electrically conductive rod members 22 which are disposed in laterally spaced, side-by-sde relationship. Assemblies 14 and 16 each includes a pair of elongated clamp elements 24 and 26 disposed to extend along cable 18 therebelow. Each of the rod members 22 may be provided with a tooled knob 28 (FIG. 2) at its upper end 30. As an alternative, rods 22a (FIG. 2A) may be used in lieu of rods 22. Each rod 22a is generally L-shaped and has a lateral extension 28a at is upper end 30a. Each of the rod members 22 or 22a is preferably constructed of spring steel or the like.

Elements 24 and 26 are preferably constructed of wood. They may be clamped together by fastener means in the nature of nails 32 as best illustrated in FIG. 4. In one embodiment (FIG. 4), the ends 30, including the knobs 28 of the rod members 22 are clamped tightly between elements 24 and 26. Because the clamp elements 24 and 26 are constructed of wood, portions thereof adjacent knobs 28 are deformed during clamping whereby to provide tight interconnection between clamp elements 24 and 26 and rod members 22.

Alternatively, the lateral extensions 28a of rod members 22a may be inserted into element 24 as best shown in FIG. 5. Extensions 28a may have pointed ends 28a' which may be driven into element 24. Also, element 24 could be provided with pre-drilled holes for receiving extensions 28a. Elements 24 and 26 are clamped together by nails 32 or the like to clamp ends 30a therebetween and to securely retain ends 28a in position within element 24.

Each assembly also includes a conductor means in the nature of a wire 34 which electrically interconnects rod members 22 or 22a as the case may be. Wire 34 preferably extends longitudinally of clamp elements 24 and 26 and is clamped therebetween against rod members 22 or 22a as best illustrated in FIGS. 4 and 5.

Hanger means 36 are provided for mounting assemblies 14 and 16 on cable 18. Hanger means 36 is operable to permit swinging of assemblies 14 and 16 about an axis extending in a direction generally parallel to cable 18. For this purpose hanger means 36 may comprise a plurality of generally J-shaped hooks 38 (FIG. 4) and a plurality of annular insulators 40 (one for each hook 38) disposed in surrounding relationship to cable 18. Each insulator 40 may preferably be provided with an annular groove 42 therein configured to receive the curved end 44 of a hook 38 therein. A spacer 47 (FIG. 3) may be provided on cable 18 between adjacent insulators 40 to maintain assemblies 14 and 16 in properly spaced relationship.

The ends 44 of hooks 38 may be slidably received within grooves 32 to permit movement of hook 38 relative to insulator 40 about the axis of cable 18. On the other hand, the insulator 40 itself may be mounted on cable 18 for movement relative thereto about said axis. Thus, assemblies 14 and 16 are free to swing about the axis of cable 18 with rod members 22 (or 22a) disposed to depend therefrom.

Alternatively, hanger means 36 may comprise a plurality of hook bolts 38a as illustrated in FIG. 5. The shanks 38a' of bolts 38a are received through pre-drilled holes 54 in element 24. Nuts 56 are threadably received upon the threaded free ends 38a" of bolts 38a. The curved ends 44a of hooks 38a are received in grooves 42 of insulators 40. Thus, nuts 56 may be tightened on ends 38a" to draw curved ends 44a toward element 24 and clamp insulators 40 tightly thereagainst. Since insulators 40 are rotatable about cable 18, assemblies 14 and 16 are free to swing about the axis of cable 18.

The wires 34 of adjacent assemblies 14 and 16 may be interconnected with a flexible conductor 45 which may be of any length but which preferably should be long enough to permit extensive relative swinging of assemblies 14 and 16 about cable 18. Likewise, a similar flexible conductor 51 may be provided at each end of structure 10 to permit extensive swinging of the assemblies 14 and 16 relative to fixed electrical conductors 52 and 53. Conductors 45 and 51 may be connected to wires 34 and to conductors 52 and 53 by any conventional means.

Viewing FIG. 1 it can be seen that rod members 22 (or 22a) may have different lengths to match the cross-sectional profile of the ground indentation. Thus, the lower end of each of the rod members is disposed in closely spaced relationship relative to the ground and no space is provided which is large enough to permit an animal to escape.

Manifestly, structure 10 is utilized in connection with an electric fence such as 46 and is charged by an AC or DC fence charger 48 in a conventional manner. Wires 34 are electrically connected to charger 48 and to rod members 22 or 22a as the case may be. Thus, the electrical potential of the rod members 22 or 22a may be maintained at an elevated level. Accordingly, if an animal comes into contact with any of the rod members 22 or 22a, structure 10 will be grounded through the body of the animal. Hence, the animal will be shocked and caused to shy away from structure 10.

During flood conditions, structure 10 will resist damage from rushing and turbulent waters as well as from heavy debris carried by such flood waters. Assemblies 14 and 16 are freely swingable to move upwardly out of the way of such flood waters and debris. The rod members 22 and 22a are preferably constructed of spring steel to preclude twisting and/or tangling of the same. When the flood waters recede the assemblies 14 and 16 readily swing downwardly by virtue of gravity to resume their normal positioning.

The simple construction of the flood gate structure increases the economy of the same. This factor is enhanced by the fact that clamp elements 24 and 26 are made of wood. However, it is to be understood and would be readily appreciated by those skilled in the art that clamp elements 24 and 26 could very well be constructed of other materials such as, for example, steel or the like. Also, it is contemplated that clamp elements 24 and 26 could be constructed of a synthetic plastic material. In this regard, it is to be recognized that assemblies 14 and 16 can be provided in standard lengths such as, for example, eight feet. This also increases the economy of the structure.

I claim:

1. Flood gate structure for use with an electric fence to provide an electric barrier at ground indentations such as ravines, gulleys, dry creek beds, streams and the like, said structure comprising:
   an elongated support adapted for spanning a ground indentation thereabove;
   an electrically conductive assembly comprising a plurality of electrically conductive rod members disposed in laterally spaced, side-by-side relationship, and conductor means electrically connected to said rod members; and
   hanger means mounting the assembly on the support for swinging about an axis extending in a direction generally parallel to the support and with said rod members normally depending therefrom.

2. Flood gate structure as set forth in claim 1 wherein said support comprises a cable, said hanger means comprising a plurality of hooks, there being included insulator means disposed between each hook and said cable.

3. Flood gate structure as set forth in claim 1 wherein said members are constructed of spring steel.

4. Flood gate structure as set forth in claim 1 wherein said assembly includes a pair of elongated clamp elements extending along said support therebelow, said elements being disposed on opposite sides of the upper ends of the members, there being provided fastener means clamping said elements together with said ends therebetween.

5. Flood gate structure as set forth in claim 4 wherein said conductor means extends longitudinally of the elements therebetween and in contacting relationship to said ends of the members.

6. Flood gate structure as set forth in claim 5 wherein said elements are constructed of wood and said members are constructed of spring steel, said members each having a knob at the upper end thereof whereby portions of the elements adjacent said knobs are deformed during construction to provide tight interconnection between the elements and the members.

7. Flood gate structure as set forth in claim 1 wherein is included at least two of said assemblies spaced along said support, there being included flexible connector means electrically interconnecting the conductor means of each assembly.

8. Flood gate structure as set forth in claim 1 wherein said rod members are constructed of different lengths to position the lower extremities thereof to match the cross-sectional profile of a given gulley, dry creek bed, stream or the like.

9. Flood gate structure as set forth in claim 2 wherein each of said insulator means comprises an annular insulator disposed in surrounding relationship to the cable, said hooks each being generally J-shaped and received around a corresponding insulator.

10. Flood gate structure as set forth in claim 5 wherein said members are L-shaped and each has a lateral extension at its upper end, each extension being received within a corresponding hole in one of the elements.

References Cited

UNITED STATES PATENTS

| | | | |
|---|---|---|---|
| 2,194,018 | 3/1940 | Grooms | 256—13 X |
| 2,476,233 | 7/1949 | Wood | 49—59 |
| 2,525,878 | 10/1950 | Droessler | 49—10 X |
| 2,636,296 | 4/1953 | King | 49—10 |
| 3,293,800 | 12/1966 | Martinmaas | 49—59 |

FOREIGN PATENTS

| | | | |
|---|---|---|---|
| 12,596 | 7/1890 | Great Britain | 256—13 |

DENNIS L. TAYLOR, Primary Examiner

U.S. Cl. X.R.
49—59; 256—10, 13